United States Patent [19]
Solomon

[11] Patent Number: 5,933,968
[45] Date of Patent: Aug. 10, 1999

[54] PUMPKIN CUTTER

[76] Inventor: Anna Solomon, 6300 Owensmouth Ave., Woodland Hills, Calif. 91367

[21] Appl. No.: 09/055,340

[22] Filed: Apr. 6, 1998

[51] Int. Cl.⁶ ........................................................ B26F 1/32
[52] U.S. Cl. .................................. 30/358; 30/315; 30/280
[58] Field of Search ............................. 30/315, 316, 355, 30/366, 280

[56] References Cited

U.S. PATENT DOCUMENTS

| | | |
|---|---|---|
| D. 268,639 | 4/1983 | Johannsen . |
| D. 369,070 | 4/1996 | Hahn . |
| D. 375,876 | 11/1996 | Allison . |
| 376,136 | 1/1888 | Burrowes ................................... 30/315 |
| 2,427,396 | 9/1947 | Ruple ........................................ 30/315 |
| 2,990,615 | 7/1961 | Ohler ........................................ 30/316 |
| 4,296,659 | 10/1981 | Nauman . |
| 4,689,885 | 9/1987 | Albanese . |

*Primary Examiner*—Douglas D. Watts
*Attorney, Agent, or Firm*—Henry M. Bissell

[57] ABSTRACT

An elongated tube having interconnected sidewalls defining a generally central cavity extending the length thereof from one end to the other end is particularly designed for cutting the "facial" openings in a pumpkin Jack-O-Lantern. The front end of the cutter has sharp pumpkin cutting edges, while the rear end of the cutter is adapted to be held for operating the cutter. Preferably, the cutter is formed of a single folded sheet of thin hard metal or plastic and is generally triangular in front and rear elevation. The cutter can taper down from the front end to the rear end. In one embodiment the cutting edges are divided into spaced longitudinally extending generally rectangular or triangular segments. The triangular segments have their apices projecting forward. One of the triangular segments may extend forward of the remainder of the triangular segments to facilitate the starting of the punching and cutting of a pumpkin. In another embodiment the front end and the rear end of the cutter have cutting edges which differ in configuration. In a further embodiment the cutter has a plug inserted into the rear end of the cutter and extending therearound to protect the hand of a user during use of the cutter. The cutter is inexpensive, durable and has improved safety in use.

9 Claims, 2 Drawing Sheets

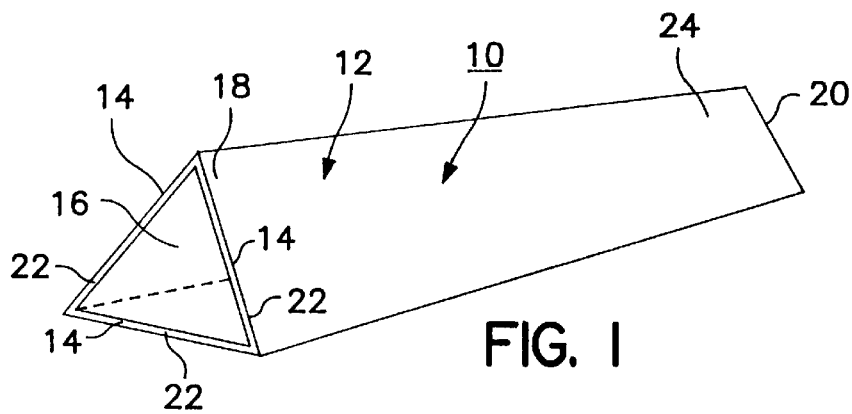
FIG. 1
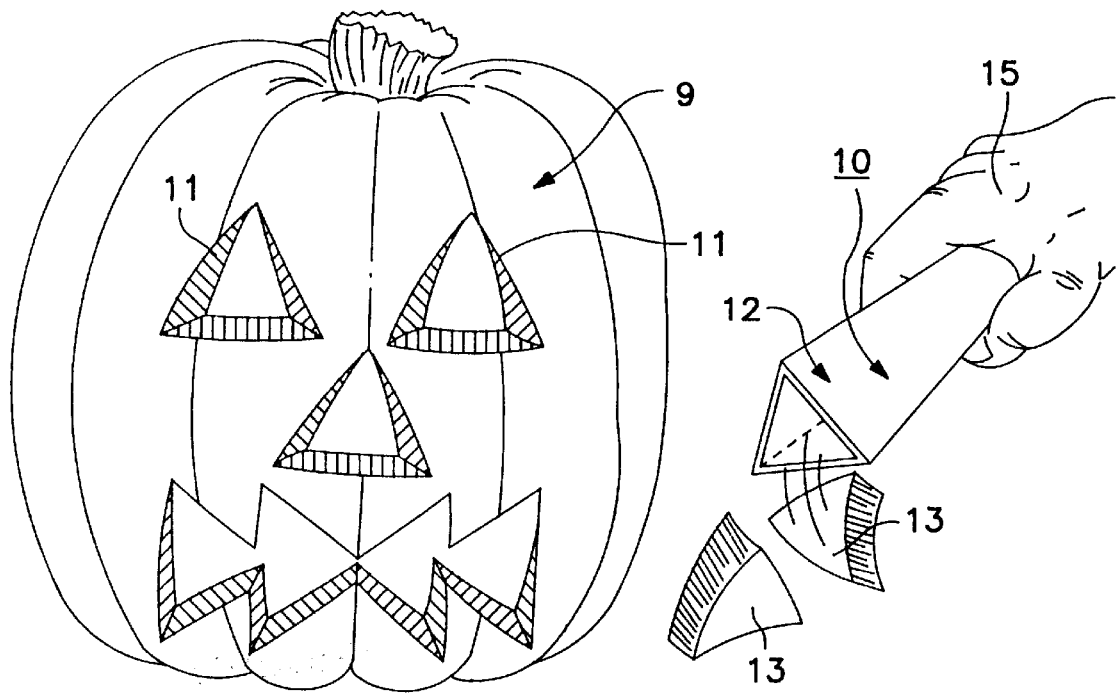
FIG. 2
FIG. 3

PUMPKIN CUTTER

BACKGROUND OF THE INVENTION

1. Field of the Invention

The present invention generally relates to cutting devices and more particularly to an improved safe pumpkin cutter for use in creating Jack-O-Lanterns.

2. Description of the Related Art

Various types of devices have been used to cut openings in pumpkins to portray attractive faces for Halloween and other occasions. Most such devices comprise knives having thin blades with serrated edges. See, for example, those knives which are shown in U.S. Design Pat. Nos. 268,639 of Johannsen, 369,070 of Hahn and 375,876 of Allison wherein the novelty mainly lies in the configuration of the knife handles. However, such knives are dangerous to use and not very efficient because the blades are thin and it is difficult to apply sufficient cutting force without bending the blades.

Specialty cutters have also been devised to cut openings in pumpkins. See, for example, U.S. Pat. No. 4,689,885 of Albanese and U.S. Pat. No. 4,296,659 of Nauman. However, such cutters are usually expensive and inefficient and in many instances are also dangerous. The Nauman devices consist of a plurality of specially configured strips of metal or plastic which are of the cookie cutter type and are very short in length. In order to use the cutters, they must be hammered into the pumpkin and cannot be easily removed therefrom.

The Albanese device comprises an elongated housing bearing cutting edges and a detachable handle. The housing itself cannot be gripped so as to be able to dispense with the handle. This device is expensive. Moreover, the handle is shaped so that it cannot be hammered to push the housing into a particularly resistant pumpkin. Since the handle is of small size, the housing cannot easily be forced in various directions into a pumpkin.

Both of these devices use cutters which are especially configured to the different openings in the Jack-O-Lantern which each is to be used to create, thus increasing the cost of the complete kit and limiting the adaptability of the device. Accordingly, there remains a need for an inexpensive, durable and efficient pumpkin cutter which has improved safety and maneuverability. Preferably, the cutter should be easy to use for a variety of pumpkin cutting operations.

SUMMARY OF THE PRESENT INVENTION

The improved safety pumpkin cutter of the present invention satisfies all the foregoing needs. The cutter is substantially as set forth in the claims, drawings and detailed description of this application.

Thus, the present improved cutter is simple, easy to use, durable and efficient and provides improved safety over conventional cutters. The present improved cutter is of unitary construction, with integral cutting edges at one or both ends and an integral hand-gripping portion at the middle and rear end thereof. The cutter is in the form of an elongated tube having interconnected sidewalls extending the length thereof and defining a generally central cavity extending from the front end to the rear end thereof.

The cutting edges in a preferred embodiment are the front ends of the sidewalls and may, if desired, be in the form of spaced segments which are generally triangular or rectangular and extend longitudinally. In one embodiment, triangular segments are employed, one of which projects forwardly of the remaining segments and functions to facilitate initial cutting of a pumpkin. In another embodiment there are cutting edges at one end of the cutter which preferably differ in configuration from those of the other end of the cutter such that either end may be used for cutting an opening.

The cutter can be formed of a single thin sheet of metal, plastic or the like in a folding operation, extrusion operation or the like. The cutter can be of any desired size and shape. A plug can be provided at the rear end of the cutter to overlie the rear surfaces and thus further protect the hand of the user. The plug can be of plastic, metal, wood or other materials having appropriate properties of stiffness and formability.

BRIEF DESCRIPTION OF THE DRAWINGS

A better understanding of the present invention may be realized from a consideration of the following detailed description, taken in conjunction with the accompanying drawings, in which:

FIG. 1 is a schematic perspective view of a first preferred embodiment of the improved pumpkin cutter of the present invention;

FIG. 2 is a schematic front elevational view of a pumpkin which has had pieces thereof cut out through the use of a cutter of the invention;

FIG. 3 is a schematic perspective view of the cutter of FIG. 1 in operation by manipulation of a user's hand;

DESCRIPTION OF THE PREFERRED EMBODIMENTS

Figure 4:
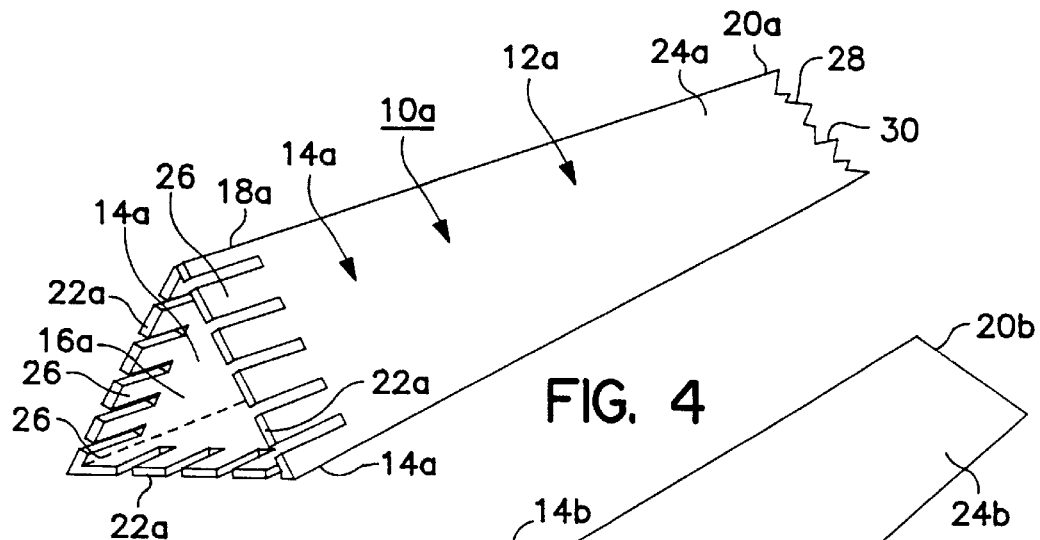
FIG. 4 is a schematic perspective view of a second preferred embodiment of the improved pumpkin cutter of the present invention.

FIGS. 1–3:

Now referring more particularly to FIGS. 1–3 of the drawings, a first preferred embodiment of the improved pumpkin cutter of the present invention is schematically depicted in FIG. 1, FIG. 2 showing a pumpkin 9 after holes 11 are cut therein by the cutter 10 of FIG. 1 and FIG. 3 showing cutter 10 just after cutting pieces 13 out of pumpkin 9, while being held in hand 15.

Thus, cutter 10 is an elongated hollow tube 12. Tube 12 is triangular in front and rear elevation, comprising interconnected sidewalls 14 defining a central cavity 16 running from the front end 18 of cutter 10 to the rear end 20 thereof. Tube 12 can be of metal, such as steel, aluminum, titanium, copper, bronze or the like, which has been extruded to the shape shown in FIG. 1 or which has been folded to reach that configuration. Tube 12 can also be of plastic or other material which is strong, thin, durable and inexpensive.

Sidewalls 14 forming front end 18 of cutter 10 have sharp front cutting edges 22 to cut the appropriate triangular holes 11 in pumpkin 9 such as are shown in FIGS. 2 and 3. It will be noted that triangular holes 11 can be arranged to form the desired pumpkin facial features shown in FIG. 2. It will also be noted that the pumpkin cutting is carried out by having hand 15 comfortably and safely grip the rear portion 24 of tube 12 adjacent rear end 20 a safe distance away from cutting edges 22.

Moreover, the triangular surfaces gripped by hand 15 help to stabilize tube 12 in hand 15. Tube 12 can be of any suitable length, such as 6–12 inches, and any suitable internal dimension, such as 1–4 inches. Moreover, tube 12 can, if desired, be tapered down from front end 18 to rear end 20 so that hand 15 can easily fit around rear portion 24. Thus, cutter 10 is simple, inexpensive, easy and safe to manipulate and is durable. It is of unitary construction and cannot be bent or otherwise damaged in use. The triangular cross-sectional shape establishes rigidity to prevent bending or collapse of the tube 12.

FIG. 4:

A second preferred embodiment of the improved pumpkin cutter of the present invention is schematically depicted in FIG. 4. Thus, cutter 10a is shown. Components thereof similar to those of cutter 10 bear the same numerals but are succeeded by the letter "a".

Thus, cutter 10a is substantially identical to cutter 10, except as follows:

a) Cutter 10a has cutting edges 22a being carried by a plurality of spaced, generally rectangular, longitudinally extending segments 26 of walls 14a, which function efficiently for pumpkin cutting; and, b) Cutter 10a has its rear end 20a bearing a plurality of cutting edges 28, in this instance having serrated surfaces 30 so that either end of cutter 10a can be used to cut out from a pumpkin different types of holes.

The other features of cutter 10 are present in cutter 10a.

Figure 5:
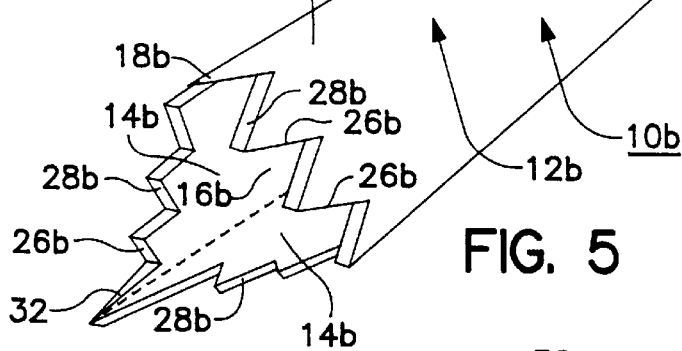
FIG. 5 is a schematic perspective view of a third preferred embodiment of the improved pumpkin cutter of the present invention.

FIG. 5:

A third preferred embodiment of the improved pumpkin cutter of the present invention is schematically shown in FIG. 5. Thus, cutter 10b is shown. Components thereof similar to those of cutter 10 or 10a bear the same numerals but are succeeded by the letter "b".

Cutter 10b is substantially identical to cutter 10, except as follows:

Sidewalls 14b at front end 18b are formed into a plurality of interconnected triangular segments 26b bearing cutting edges 28b, and with the apices of segments 26b extending forward and the bases thereof extending rearwardly in a generally sawtooth configuration. Moreover, one triangular segment 32 projects forwardly of the remaining segments 26b and is used to facilitate the initial cutting into a pumpkin when punching a hole therein.

Cutter 10b has the other advantages of cutter 10.

Figure 6:
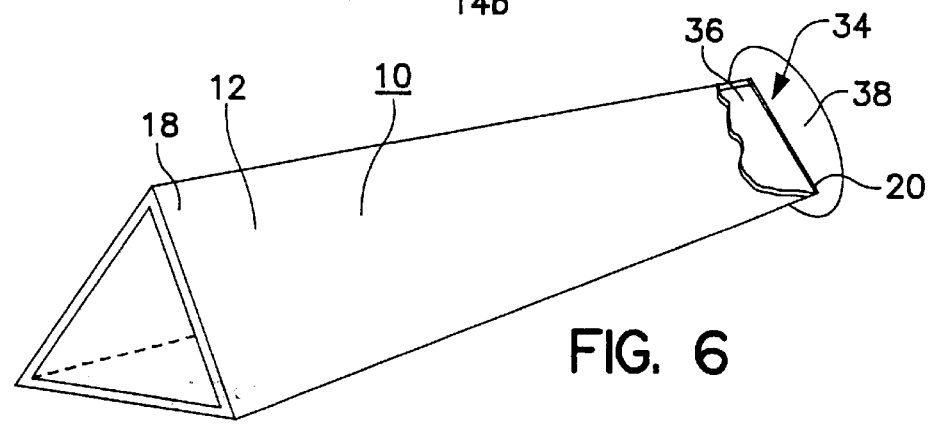
FIG. 6 is a schematic perspective view, partly broken away, of the cutter of FIG. 1 fitted with a plug in and around the rear end thereof as an additional safety precaution and to facilitate palm pushing of the cutter into a pumpkin.
Figure 7:
FIG. 7 is a schematic side elevation of the plug of FIG. 6.
Figure 8:
FIG. 8 is a view of the shape of the plug of FIGS. 6 and 7, taken along the section line 8—8 of FIG. 7.

FIGS. 6–8:

FIG. 6 schematically depicts cutter 10 with a rear end plug 34, while FIGS. 7 and 8 depict the shape of plug 34. Plug 34 can be of wood, plastic, metal or another material and includes a front portion 36 wedged into the rear end of cavity 16 and an integral rear portion 38 having an outer lip which projects laterally outwardly from sidewalls 14 to protect the hand of the user when the fingers are used or the palm is used to push cutting edges 22 into pumpkin 9 or the like. Rear portion 38 can also be gripped to help pull cutter 10 out of pumpkin 9 or the like.

Figure 9:
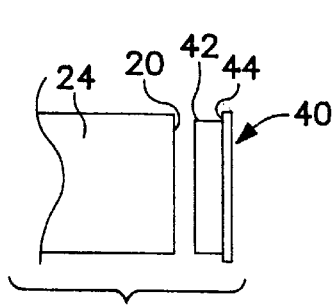
FIG. 9 is a schematic exploded view of the rear end portion of the cutter of FIG. 1 showing an optional guard device provided as an alternative to the plug of FIGS. 6–8.
Figure 9:
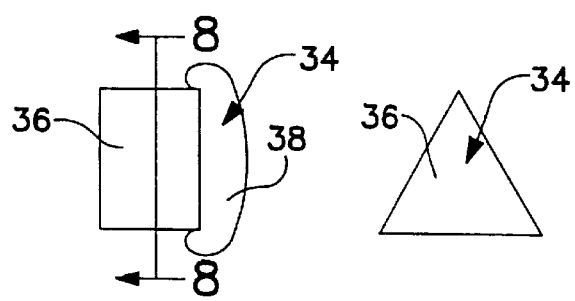
Figure 9:

FIG. 9:

FIG. 9 is a view showing the rear portion 24 and rear end 20 of cutter 10 of FIG. 1 with a plug 40 which is shaped to mate with rear end 20. The plug 40 is configured to fit within the rear end 20 to provide protection to the palm of the user's hand when pushing the cutter 10 into and through the shell of the pumpkin 9. The plug 40 has an insert portion 42 with outer dimensions adapted to fit into the rear portion 24 within the opening of the rear end 20 and a lip 44 which abuts against the rear end 20. When the plug 40 is inserted into the rear portion 24 as indicated, it provides an end cap for the rear end 20 which protects the user's hand against the possibly sharp edges at the rear end 20.

Although there have been described hereinabove various specific arrangements of an IMPROVED PUMPKIN CUTTER in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved pumpkin cutter, said cutter comprising an elongated tube having a plurality of interconnected sidewalls defining a generally central cavity extending the length of said tube from the front end of said cutter to the rear end thereof, said front end having a plurality of sharp cutting edges integral with said sidewalls for cutting into and punching out segments of a pumpkin to form facial feature openings in a pumpkin, said rear end being adapted to be safely held by the hand of a user to force said cutting edges into a pumpkin for said cutting and punching, said cutting edges comprising a plurality of spaced longitudinally extending segments and being generally triangular with forwardly extending apices and interconnected bases, wherein said triangular segments include a most forwardly extending segment to facilitate initial punching and cutting with said cutter.

2. The improved pumpkin cutter of claim 1 wherein said cutter is generally triangular in front and rear elevation.

3. The improved pumpkin cutter of claim 1 wherein said cutter tapers down from said front end to said rear end to facilitate gripping of said cutter and removal of said cutter from a pumpkin.

4. The improved pumpkin cutter of claim 1 wherein said cutter is formed of a single thin sheet of a hard durable material.

5. The improved pumpkin cutter of claim 4 wherein said sheet material is one of metal and plastic.

6. The improved pumpkin cutter of claim 1 wherein said cutter includes a plug inserted into the rear end thereof and extending thereacross to protect the hand of a user of the cutter.

7. The improved pumpkin cutter of claim 6 wherein said plug has a curved outer surface which extends past the edges at the rear end of the cutter to encompass said edges and engage the outer surfaces at the rear portion of the cutter.

8. The improved pumpkin cutter of claim 1 wherein said cutter includes cutting edges at the rear end thereof.

9. The improved pumpkin cutter of claim 8 wherein said cutting edges at said rear end differ in configuration from those at said front end.

* * * * *